(12) United States Patent
Sekino et al.

(10) Patent No.: US 9,688,229 B2
(45) Date of Patent: Jun. 27, 2017

(54) AIRBAG DEVICE

(71) Applicant: ASHIMORI INDUSTRY CO., LTD., Osaka-shi (JP)

(72) Inventors: Tadaaki Sekino, Settsu (JP); Naoki Yamaji, Settsu (JP); Takahiko Yamamura, Settsu (JP); Keita Yamauchi, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 15/011,972

(22) Filed: Feb. 1, 2016

(65) Prior Publication Data
US 2016/0221524 A1    Aug. 4, 2016

(30) Foreign Application Priority Data
Feb. 3, 2015    (JP) ................. 2015-018956

(51) Int. Cl.
*B60R 21/235* (2006.01)
*B60R 21/203* (2006.01)
*B60R 21/2338* (2011.01)

(52) U.S. Cl.
CPC ........ *B60R 21/2035* (2013.01); *B60R 21/235* (2013.01); *B60R 21/2338* (2013.01); *B60R 2021/23382* (2013.01); *B60R 2021/23514* (2013.01); *B60R 2021/23533* (2013.01); *B60R 2021/23571* (2013.01)

(58) Field of Classification Search
CPC ............ B60R 21/2035; B60R 21/2338; B60R 21/235; B60R 2021/23571; B60R 2021/23514; B60R 2021/23533; B60R 2021/23382
See application file for complete search history.

(56) References Cited

U.S. PATENT DOCUMENTS

| 5,090,729 | A * | 2/1992 | Watanabe ............. B60R 21/231 |
| | | | 280/731 |
| 6,260,877 | B1 * | 7/2001 | Rasmussen, Sr. .... B60R 21/203 |
| | | | 280/729 |
| 6,394,489 | B1 * | 5/2002 | Faigle ................. B60R 21/2035 |
| | | | 280/731 |

(Continued)

FOREIGN PATENT DOCUMENTS

JP    2007-15478    1/2007
JP    2013-14176    1/2013

*Primary Examiner* — Drew J Brown
(74) *Attorney, Agent, or Firm* — Oblon, McClelland, Maier & Neustadt, L.L.P.

(57) ABSTRACT

An airbag of an airbag device for a driver seat has a front panel and a back panel. In the airbag having undergone spontaneous inflation, when a size between a securing position of the airbag to a retainer member and the most protruding portion of the airbag with respect to the securing position is set as 1, the most protruding portion by the back panel is located at a position spaced from the securing position by 0.5 or greater, a diameter of the inflated airbag of an opposing portion to an inner surface of the wheel is 0.6 to 1.2 times as large as an inner diameter of the wheel, and a diameter of the inflated airbag of a joint portion of the front panel and the back panel is greater than the diameter of the inflated airbag of the opposing portion to the inner surface of the wheel.

4 Claims, 10 Drawing Sheets

(56) References Cited

U.S. PATENT DOCUMENTS

| | | | |
|---|---|---|---|
| 8,608,199 B2* | 12/2013 | Fischer | B60R 21/203 280/743.1 |
| 8,678,429 B2 | 3/2014 | Nagasawa et al. | |
| 2002/0043791 A1* | 4/2002 | Barnes | B60R 21/233 280/743.1 |
| 2004/0256840 A1* | 12/2004 | Lutter | B60R 21/2035 280/728.3 |
| 2005/0121889 A1* | 6/2005 | Enders | B60R 21/203 280/731 |
| 2008/0001387 A1* | 1/2008 | Andersson | B60R 21/2035 280/741 |
| 2010/0090446 A1* | 4/2010 | Choi | B60R 21/2035 280/728.2 |
| 2010/0194078 A1* | 8/2010 | Harvey | B60R 21/2035 280/728.2 |
| 2013/0285356 A1* | 10/2013 | Fischer | B60R 21/203 280/731 |
| 2015/0042082 A1* | 2/2015 | Koshikawa | B60R 21/203 280/739 |
| 2016/0250993 A1* | 9/2016 | Nagatani | B60R 21/2338 |
| 2016/0288756 A1* | 10/2016 | Ishiguro | B60R 21/203 |

\* cited by examiner

| | RATIO OF SIZE A OF INFLATED AIRBAG TO INNER DIAMETER SIZE B OF WHEEL (A/B) | RATIO OF SIZE L3 TO SIZE L2 OF INLATED AIRBAG (L3/L2) | INCLINATION ANGLE ($\alpha$) |
|---|---|---|---|
| OBLATE SPHEROID SHAPE | 1.15 | 0.48 | — |
| EMBODIMENT 1 | 0.82 | 0.59 | 39 |
| EMBODIMENT 2 | 0.84 | 0.64 | 43 |
| EMBODIMENT 3 | 0.85 | 0.71 | 52 |
| EMBODIMENT 4 | 0.67 | 0.71 | 52 |
| EMBODIMENT 5 | 1.13 | 0.69 | 50 |

AIRBAG DEVICE

BACKGROUND

Technical Field

The disclosure relates to an airbag device for a driver seat.

Description of the Background Art

Japanese Patent Application Laid-Open Publication No. 2007-15478 discloses an airbag of which an upper fabric and a lower fabric cut into circular shapes are stitched each other at outer peripheral edges thereof to form a bag shape. The airbag is configured to inflate in an oblate spheroid shape towards an occupant-side with respect to a steering wheel by gas generated from an inflator, thereby holding the occupant.

Japanese Patent Application Laid-Open Publication No. 2013-14176 discloses an airbag having an extension portion arranged at least at one side edge in a width direction of a vehicle and deployable to extend towards a rear side of the vehicle. The airbag is accommodated in a center pad, which is arranged to have a non-rotational structure with respect to a steering wheel so that the extension portion can be deployed at a constant position at any steering angle of the steering wheel.

SUMMARY

Technical Problem

When an obstacle collides obliquely forward with a vehicle, an occupant is moved obliquely forward due to the inertia force occurring upon the collision.

In Japanese Patent Application Laid-Open Publication No. 2007-15478, the movement of the airbag having undergone the oblate spheroid inflation is restrained by the steering wheel. At this state, in order to hold the occupant, who intends to move obliquely forward, by the airbag, it is necessary to increase a diameter of the inflated airbag. To this end, it is necessary to increase a volume of the airbag.

Also, according to Japanese Patent Application Laid-Open Publication No. 2013-14176, the airbag has the extension portion, so that it is necessary to increase the volume as much as that.

In order to increase the capacity of the airbag, it is necessary to use an inflator having a large amount of gas generation, which in turn increases the cost.

It is therefore an object of the disclosure to provide an airbag for a driver seat configured to hold an occupant who is moving obliquely forward, while avoiding an increase in a capacity of the airbag as much as possible.

Solution to Problem

In order to achieve the above object, a first aspect of the disclosure provides an airbag device that is attachable to a steering wheel including a wheel hub and an annular wheel provided around the wheel hub. The airbag device includes an inflator that generates gas; an airbag that is inflatable by the gas generated by the inflator and includes a front panel, which includes at least one fabric and is capable of restraining an occupant upon inflation under emergency of a vehicle, and a back panel, which includes at least one fabric and is provided at a side closer to the wheel hub than the front panel; and a retainer member that is secured to the wheel hub at a state where the inflator and the airbag are secured. In the airbag having undergone spontaneous inflation without being attached to the steering wheel, when a size between a securing position of the airbag to the retainer member and the most protruding portion of the airbag with respect to the securing position is set to 1, the most protruding portion by the back panel is located at a position spaced from the securing position by 0.5 or greater, a diameter of the inflated airbag of an opposing portion to an inner surface of the wheel is 0.6 to 1.2 times as large as an inner diameter of the wheel, and a diameter of the inflated airbag of a joint portion of the front panel and the back panel is greater than the diameter of the inflated airbag of the opposing portion to the inner surface of the wheel.

A second aspect of the disclosure is the airbag device of the first aspect wherein in the airbag having undergone spontaneous inflation without being attached to the steering wheel, when the size between the securing position of the airbag to the retainer member and the most protruding portion of the airbag with respect to the securing position is set to 1, a central position of the airbag is located at a position spaced from the securing position by 0.5 or greater.

A third aspect of the disclosure is the airbag device of the second aspect wherein mass of the at least one fabric per unit area, which is to be included in the front panel, is greater than mass of the at least one fabric per unit area, which is to be included in the back panel.

A fourth aspect of the disclosure is the airbag device of the second or third aspect wherein the front panel includes a mass body attached to at least a part of the front panel.

Advantageous Effects

According to the airbag device of the first aspect, in the airbag having undergone spontaneous inflation, since the diameter of the inflated airbag of the opposing portion to the inner surface of the wheel is 0.6 to 1.2 times as large as the inner diameter of the wheel, when the airbag secured to the retainer member is inflated, the airbag is difficult to contact the inner surface of the wheel with high force. Also, when the size between the securing position and the most protruding portion of the airbag with respect to the securing position is set as 1, the joint portion of the front panel and the back panel is located at a position spaced by 0.5 or greater. Also, since the diameter of the inflated airbag of the joint portion is greater than the diameter of the inflated airbag of the opposing portion to the inner surface of the wheel, an inflation shape of the back panel becomes greater towards the occupant-side across the wheel. Therefore, a space can be easily formed between a surface of the wheel facing the occupant-side and the airbag.

For this reason, the airbag can swing about a securing place to the retainer member. When the occupant is contacted to the airbag, even though a moving direction of the occupant is oblique with respect to a front-rear direction of the vehicle, the airbag can be obliquely moved in the moving direction of the occupant. Thereby, it is possible to hold the occupant who is moving obliquely forward, while avoiding an increase in a capacity of the airbag as much as possible.

According to the second aspect, since the central position of the airbag is positioned between the retainer member and the occupant or located at a position close to the occupant-side, the airbag can be more easily moved about the securing place to the retainer member.

According to the third aspect, the mass of the at least one fabric per unit area, which is to be included in the front panel, is greater than the mass of the at least one fabric per unit area, which is to be included in the back panel. Thereby, it is possible to set the central position of the airbag at a side close to the occupant.

According to the fourth aspect, it is possible to increase the mass of the front panel by the mass body, so that it is possible to set the central position of the airbag at a side closer to the occupant.

These and other objects, features, aspects and advantages of the present disclosure will become more apparent from the following detailed description of the present disclosure when taken in conjunction with the accompanying drawings.

DESCRIPTION OF THE EMBODIMENTS

Figure 1:
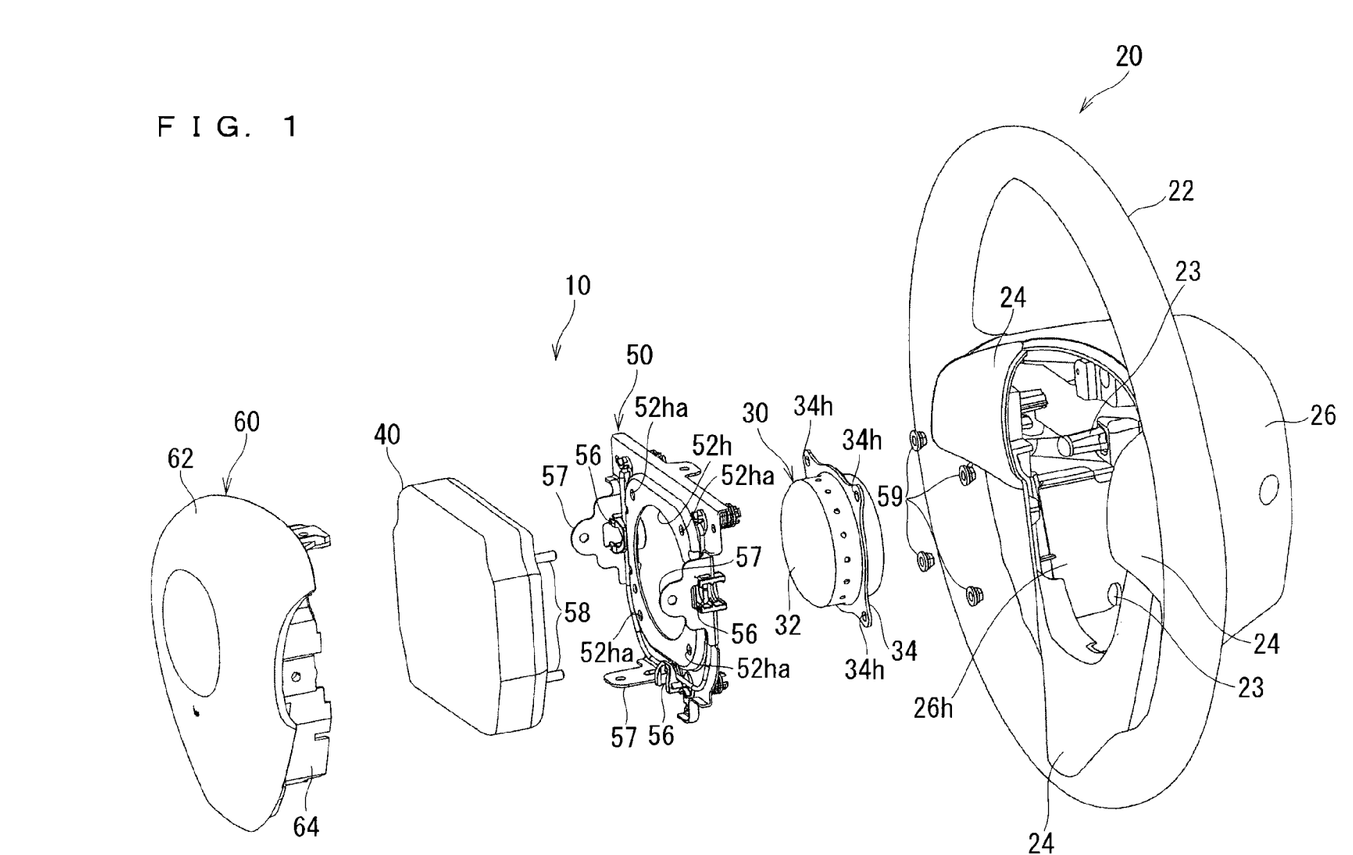
FIG. 1 is an exploded perspective view depicting an airbag device in accordance with an illustrative embodiment.
Figure 2:
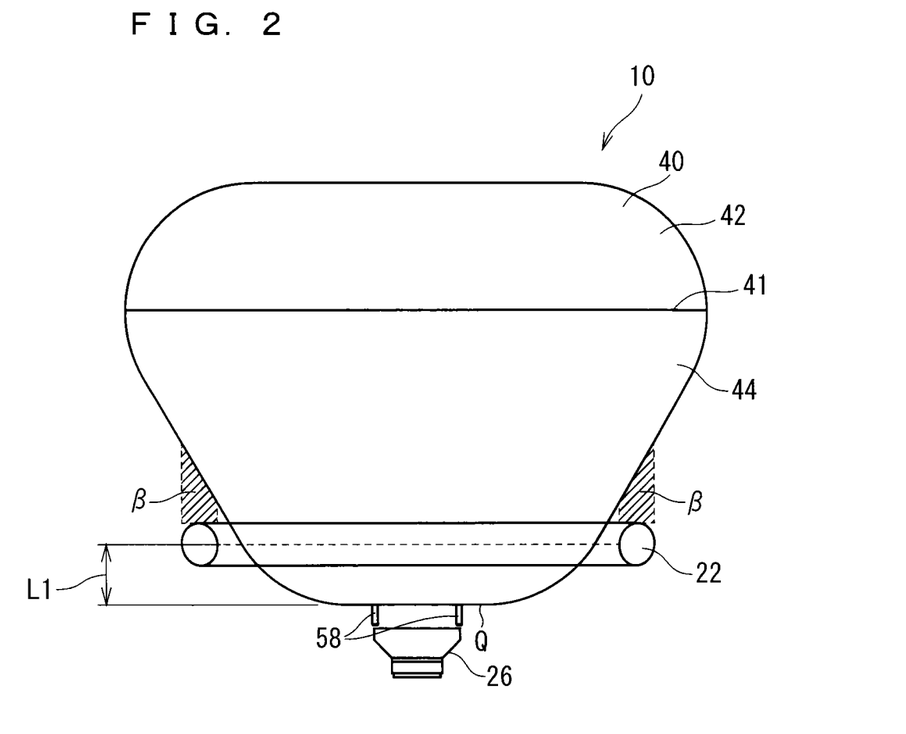
FIG. 2 illustrates an inflated state of an airbag.

Hereinafter, an airbag device of an illustrative embodiment will be described. FIG. 1 is an exploded perspective view depicting an airbag device 10, and FIG. 2 illustrates an inflated state of an airbag 40. Meanwhile, in FIG. 2 and the like, a wheel 22 of a steering wheel 20 and a central part of a wheel hub 26 are shown.

The airbag device 10 is configured so that it can be attached to the steering wheel 20 in a vehicle.

The steering wheel 20 is provided to steer the vehicle and has a wheel 22, spokes 24 and a wheel hub 26.

The wheel 22 has an annular shape and is a part to which a steering force is to be applied from an occupant (a driver). The wheel hub 26 is configured so that it can be coupled to a tip portion of a steering shaft extending from the front of a driver seat towards the occupant in the vehicle. The spokes 24 extend from an inner surface of the wheel 22 towards a center of the wheel and are coupled to the wheel hub 26. Here, the three spokes 24 are provided. However, the two spokes may also be provided, for example. When the wheel 22 is rotated, the rotational movement is transmitted to the steering shaft through the spokes 24 and the wheel hub 26.

The steering wheel 20 is usually configured by an armature and a resin covering part configured to cover the armature. The armature is formed of metal and has a configuration where a part configuring the wheel hub 26, a part configuring inner cores of the spokes 24 and an annular part configuring an inner core of the wheel 22 are integrated. The resin covering part is configured to cover the part configuring the spokes 24 and the part configuring the wheel 22 of the armature. A part of the resin covering part, which configures the wheel 22, is also referred to as a rim.

The wheel hub 26 is configured to secure and accommodate the airbag device 10. Here, the wheel hub 26 is formed with an accommodating recess portion 26h that opens towards an occupant-side. Also, the wheel hub 26 is formed therein with engaging protruding portions 23 capable of engaging and securing the airbag device 10. The airbag device 10 is accommodated and secured in the accommodating recess portion 26h at a state where the engaging protruding portions 23 are engaged and secured to the airbag device 10.

In a direction of a central axis of the wheel 22, the wheel hub 26 is arranged at a position closer to the steering shaft than the wheel 22, i.e., at a position distant from the occupant.

The airbag device 10 has an inflator 30, an airbag 40 and a retainer member 50. Here, the airbag device 10 has a cover 60 configured to close the opening of the accommodating recess portion 26h, too.

The inflator 30 is configured to generate gas. Here, the inflator 30 has an inflator main body 32 having a short cylinder shape and attaching flanges 34 formed on an outer periphery of the inflator main body 32. In the inflator main body 32, an ignition device, a gas-forming agent and the like are incorporated. When a detection signal from a shock detection unit is received upon collision of the vehicle, the ignition device ignites the gas-forming agent. Thereby, the gas-forming agent is combusted, so that the gas generated by the combustion is supplied into the airbag 40. Thereby, the airbag 40 is inflated and deployed towards the driver. The attaching flanges 34 have a plate shape extending from the outer periphery of the inflator main body 32 so that outer peripheral edges thereof form a rectangular shape, and four corner portions thereof are formed with securing holes 34h.

The airbag 40 has a bag shape formed of fabric and the like, and is folded to be accommodated in the accommodating recess portion 26h. The airbag is configured to inflate by the gas that is to be generated by the inflator 30.

Figure 3:
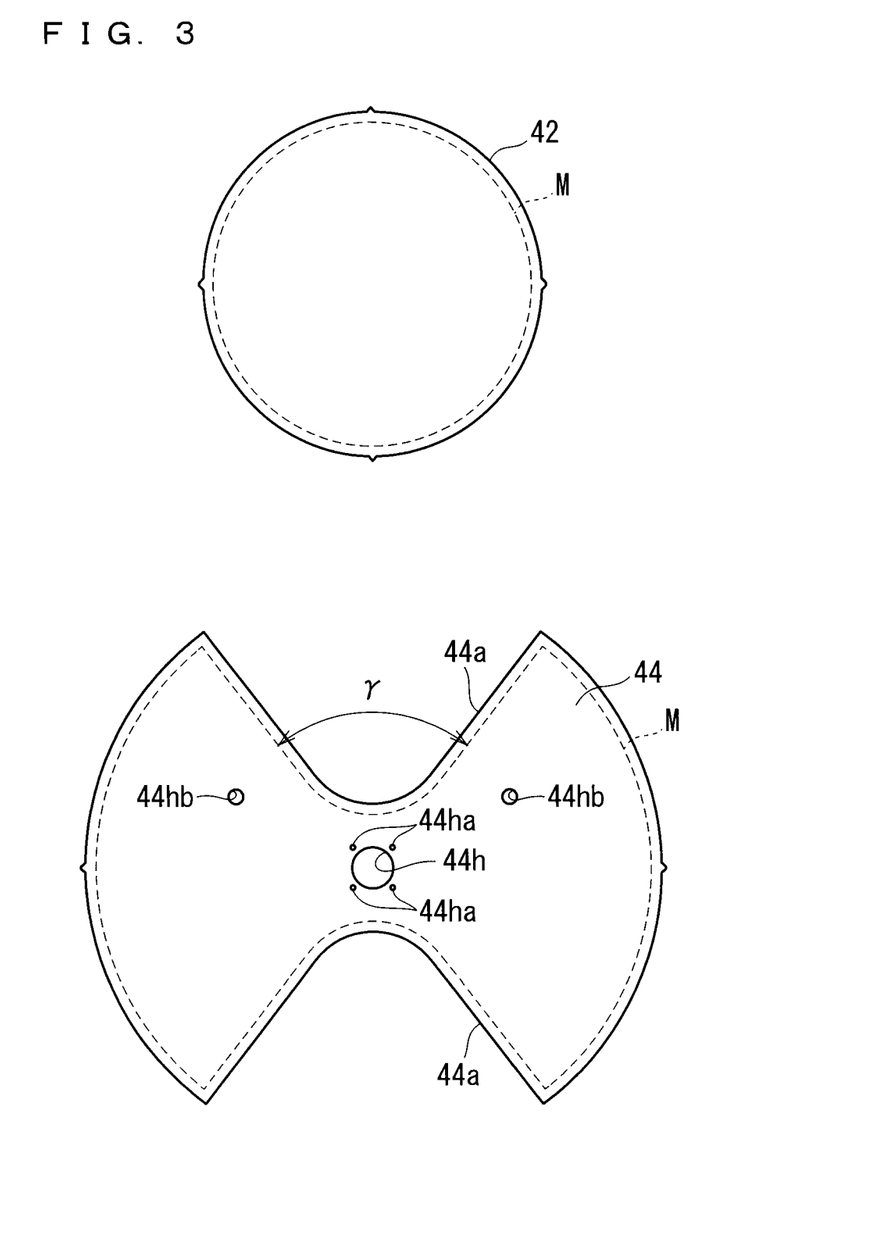
FIG. 3 depicts examples of panels configuring the airbag.

More specifically, FIG. 3 depicts examples of panels configuring the airbag 40. The airbag 40 has a front panel 42 and a back panel 44.

The front panel 42 is provided at a part at which the occupant can be restrained upon inflation of the airbag 40 under emergency of the vehicle. That is, the front panel 42 is a part that is provided at the occupant-side at a state where the airbag 40 has undergone inflation with being attached to the steering wheel 20. Here, the front panel 42 consists of one fabric and has a circular shape. As the fabric, a woven fabric, a fabric of which a woven fabric is applied with a coating agent such as silicone, and the like are used. The front panel 42 may consist of at least one fabric or a plurality of fabrics partially or entirely superimposed. Meanwhile, in FIG. 3, stitch lines M are shown at an outer periphery of the front panel 42 and an outer periphery of the back panel 44.

The back panel 44 is provided at a side closer to the retainer member 50 (the wheel hub 26) than the front panel 42. That is, the back panel 44 is a part that is provided at an opposite side to the occupant-side at the state where the airbag 40 has undergone inflation with being attached to the steering wheel 20. Here, the back panel 44 consists of one fabric and has a circular shape. As the fabric, a woven fabric, a fabric of which a woven fabric is applied with a coating agent such as silicone, and the like are used. Also, the back panel 44 may consist of at least one fabric or a plurality of fabrics partially or entirely superimposed.

The back panel 44 is formed with an attaching hole 44h. A part (a part having a gas exhaust port) of the inflator main body 32 is arranged in the airbag 40 through the attaching hole 44h. Also, the back panel 44 is formed with a plurality of (four, here) screw insertion holes 44ha around the attaching hole 44h. Further, the back panel 44 is formed with vent holes 44hb for discharging the gas after the airbag inflation between the attaching hole 44h and a peripheral edge portion of the back panel 44.

The peripheral edge portion of the front panel 42 and the peripheral edge portion of the back panel 44 are joined by the stitching, for example, so that the airbag 40 is formed. The joined portion of the peripheral edge portion of the front panel 42 and the peripheral edge portion of the back panel 44 is a joint portion 41.

Figure 5:
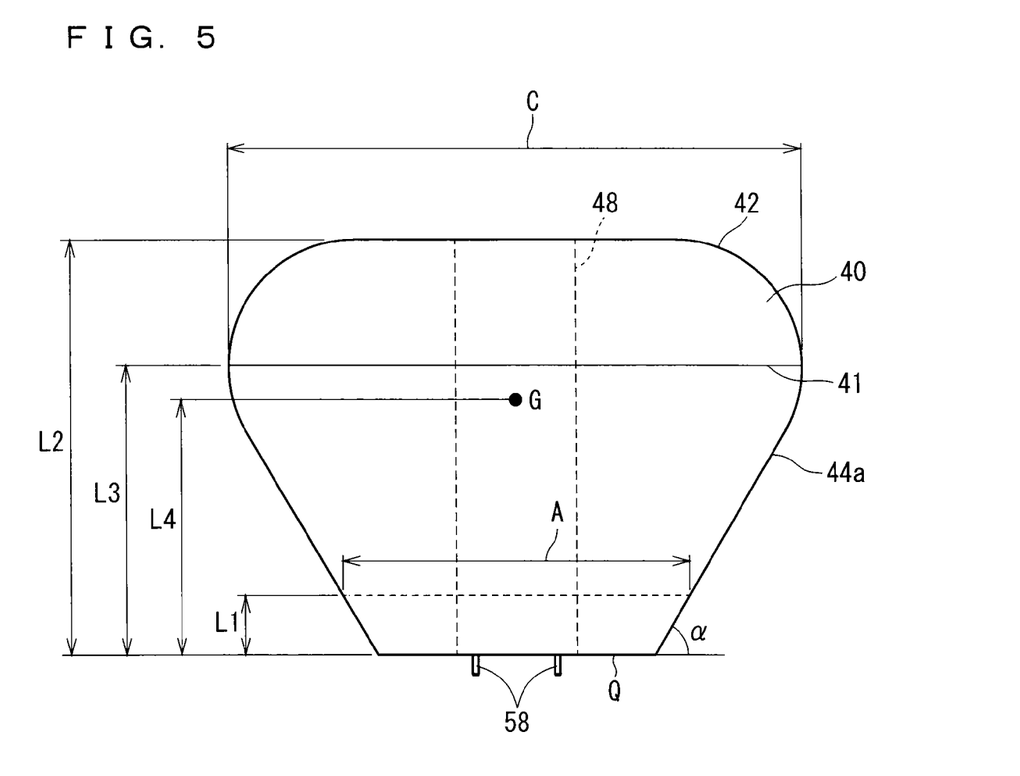
FIG. 5 depicts a positional relation of respective parts of the airbag having undergone spontaneous inflation.

In the meantime, the shapes of the panels 42, 44 of the airbag 40 and the inflation shape of the airbag 40 are not limited to the above examples. A modified embodiment thereof will be described later. Also, the panels 42, 44 may be configured by a combination of a plurality of fabrics. An example where the panel 44 is configured by a combination of a plurality of fabrics will be described later. Also, the inflation shape of the airbag 40 can be regulated by a tether belt arranged to connect insides of the airbag. FIG. 5 depicts an example where a tether belt 48 is arranged to connect a periphery of the attaching hole 44h and a part of the occupant-side of the airbag 40.

Returning to FIG. 1 and FIG. 2, the retainer member 50 is configured so that it can be secured to the wheel hub 26 at a state where the inflator 30 and the airbag 40 are secured.

More specifically, the retainer member 50 is a member having a plate shape and made of metal and the like, and is formed at its central portion with an inflator arranging hole 52h capable of arranging the inflator main body 32 therein. The retainer member 50 is formed with screw insertion holes 52ha around the inflator arranging hole 52h. At a state where the inflator main body 32 is arranged in the inflator arranging hole 52h and a part (a part having a gas exhaust port) of the inflator main body 32 is arranged in the airbag 40 through the attaching hole 44h, screws 58 protruding from an internal retainer plate arranged in the inflator 30 are inserted into the screw insertion holes 44ha, the screw insertion holes 52ha and the securing holes 34h. Nuts 59 are screwed and fastened to the screws 58, so that the inflator 30 is secured to the retainer member 50. Also, the peripheral edge of the attaching hole 44h of the airbag 40 is interposed between the internal retainer plate and the retainer member 50, so that the airbag 40 is secured to the retainer member 50.

Also, the retainer member 50 is formed with receive-side engaging parts 56 capable of engaging and securing the securing protruding portions 23 provided to stand from the wheel hub 26. The securing protruding portions 23 are fitted and secured to the receive-side engaging parts 56, so that the retainer member 50 is secured to the wheel hub 26. At this state, the inflator 30 and the airbag 40 secured to the retainer member 50 are also accommodated in the accommodating recess portion 26h of the wheel hub 26.

At this state, the retainer member 50 is positioned at a back of the accommodating recess portion 26h. For this reason, a securing position Q of the airbag 40 to the retainer member 50 is located at an opposite side to the occupant than a position of the wheel 22 in the direction of the central axis of the wheel 22.

Also, the retainer member 50 is formed with cover securing pieces 57 protruding towards the occupant-side.

The cover 60 is a member formed of resin and the like, and has a cover main body 62 configured to cover the opening of the accommodating recess portion 26h and an occupant-side of the folded airbag 40, and has a peripheral wall 64 protruding from a back side of the cover main body 62 and configured to cover a periphery of the folded airbag 40. The cover securing pieces 57 of the retainer member 50 are secured to the peripheral wall 64 by screwing, riveting, an engaging and securing structure, and the like. Thereby, the cover 60 is also secured to the retainer member 50.

At a state where the retainer member 50 is secured to the wheel hub 26, the peripheral wall 64 of the cover 60 is configured to cover the airbag 40 folded in the accommodating recess portion 26h, i.e., the cover main body 62 is configured to cover the opening of the accommodating recess portion 26h. A part of the cover 60 facing the folded airbag 40 is formed with a tear-line for easy tearing. When the airbag 40 is inflated, the airbag 40 tears the cover main body 62 along the tear-line (not shown), so that an opening for inflation of the airbag 40 is formed. The airbag 40 can be inflated from the steering wheel 20 towards the occupant-side through the opening.

At a state where the airbag 40 is inflated from the steering wheel 20, the airbag 40 is deployed towards the occupant-side along the central axis of the inflator main body 32. For this reason, when the occupant is moved towards the front of the vehicle along a front-rear direction of the vehicle due to the inertia force generated upon the collision of the vehicle, such as the front collision of the vehicle, the occupant is received at the central part of the airbag 40.

In the meantime, when an obstacle collides obliquely forward with the vehicle, for example, the occupant is moved obliquely forward due to the inertia force generated upon the collision. In this case, when the airbag 40 keeps a state where it is deployed towards the occupant-side along the central axis of the inflator main body 32, the occupant is contacted to the peripheral part of the airbag 40. In order to effectively hold the occupant, the airbag 40 is preferably configured to receive the occupant at a position as close as possible to the central part of the airbag.

Figure 4:
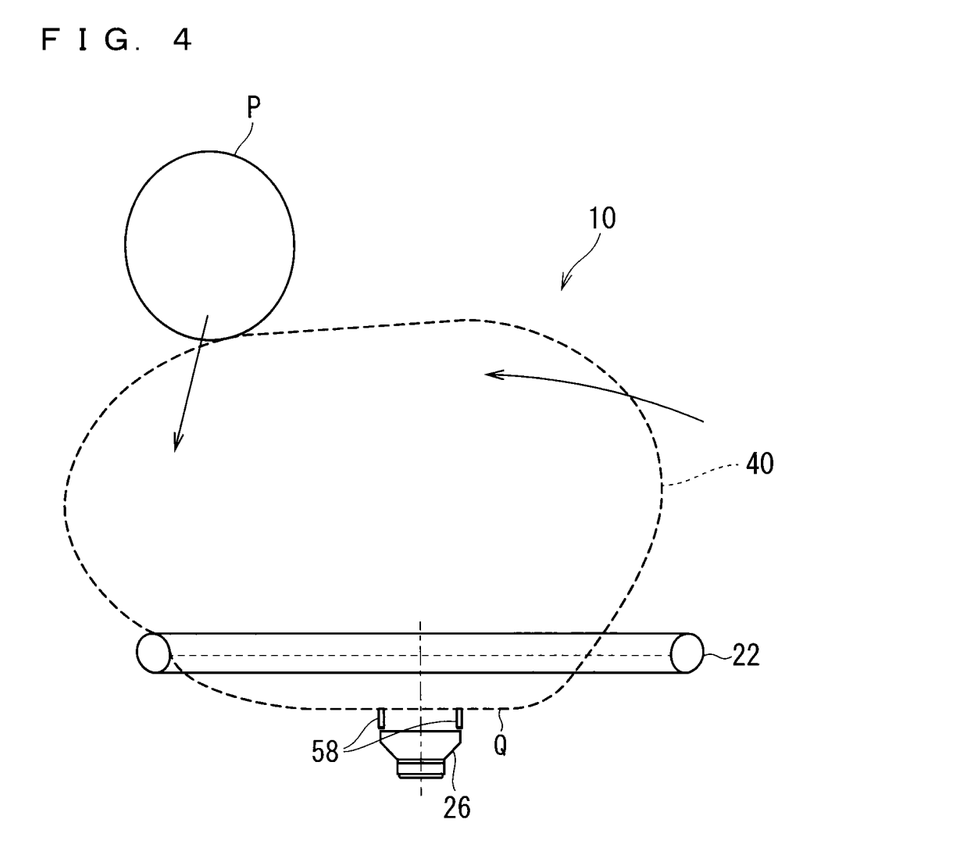
FIG. 4 illustrates a state where an occupant moving in an obliquely forward direction of a vehicle is contacted to the airbag.

Therefore, here, the airbag 40 is configured to swing about a securing place to the retainer member 50. Thereby, as shown in FIG. 4, when the occupant P intends to move obliquely forward, the occupant P is contacted to the airbag 40 in the obliquely forward direction of the vehicle. Then, the airbag 40 is pushed by the occupant P, so that the airbag 40 swings about the securing place to the retainer member 50. For this reason, the airbag 40 can receive the occupant P at a position as close as possible to the central part thereof. Thereby, it is possible to effectively hold the occupant P, who intends to move in the obliquely forward direction of the vehicle, by the airbag 40.

A following configuration is adopted so that the airbag 40 can easily swing about the securing place to the retainer member 50.

First, the wheel 22 is provided at a position closer to the occupant-side than the securing place of the airbag 40 to the retainer member 50. For this reason, the airbag 40 is inflated towards the occupant-side through the inside of the wheel 22. At a state where the airbag 40 is inflated into a bag shape, since the wheel 22 exists around the securing place, the wheel 22 operates to prevent the airbag 40 from swinging. Therefore, a following configuration is adopted so as to prevent the interference between the inflated airbag 40 and the wheel 22 as much as possible.

That is, as shown in FIG. 5, the airbag 40 having undergone spontaneous inflation without being attached to the steering wheel 20 is assumed. Here, the spontaneous inflation of the airbag 40 means a state where the airbag 40 has undergone full spontaneous inflation by the gas generated from the inflator 30. For this reason, as an actual inflation shape of the airbag 40, an inflation shape considering the impetus of the gas from the inflator 30 is assumed. First of all, following conditions are preferably satisfied even at a state where the vent holes are closed, so that the air is filled and the airbag 40 is thus inflated.

Figure 6:
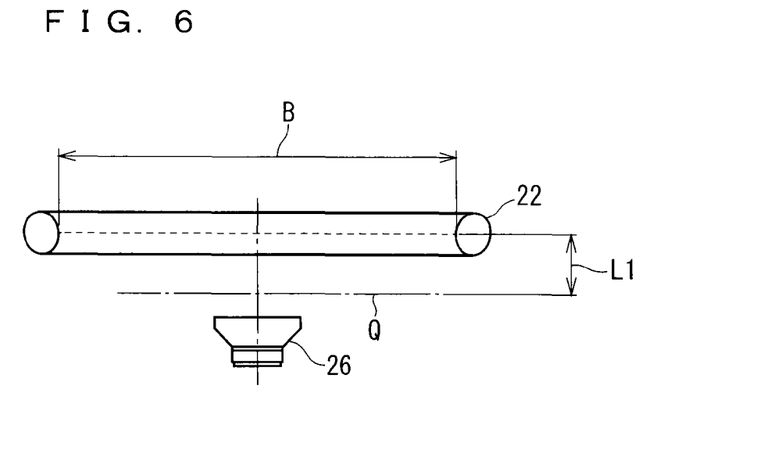
FIG. 6 depicts a positional relation of respective parts of a steering wheel.

At the above inflation state, a diameter of the inflated airbag 40 of an opposing portion to an inner surface of the wheel 22 is set as a size A. That is, as shown in FIG. 6, a distance (on the basis of a place (here, a center of the section) at which an inner diameter of the wheel 22 is smallest) of the wheel 22 to the securing position Q of the airbag 40 to the retainer member 50 is denoted as L1. As shown in FIG. 5, at a state where the airbag 40 has undergone spontaneous inflation, a diameter of the inflated airbag 40 at a position spaced from the securing position Q by the distance L1 is set as the size A. Also, as shown in FIG. 6, an inner diameter (the smallest inner diameter) of the wheel 22 is denoted as B.

In this case, the size A (the diameter of the inflated airbag 40) is set to a size of 0.6 to 1.2 times as large as the size (the inner diameter of the wheel 22) B. More preferably, the size A (the diameter of the inflated airbag 40) is set to a size of 0.6 to 1.0 times as large as the size (the inner diameter of the wheel 22) B.

Also, at the inflation state, a size between the securing position Q and the most protruding portion of the airbag 40 with respect to the securing position Q is denoted as L2, and a size between the securing position Q and the joint portion 41 of the front panel 42 and the back panel 44 is denoted as L3. At the state where the airbag 40 has undergone spontaneous inflation, a diameter of the inflated airbag 40 of the joint portion 41 of the front panel 42 and the back panel 44 is set as a size C.

In this case, when L3≥0.5×L2, i.e., the size L2 is 1, the most protruding portion (i.e., the joint portion 41) by the back panel 44 is located at a position spaced from the securing position Q by 0.5 or greater. Also, the size C (the diameter of the inflated airbag 40 of the joint portion 41) is set to be greater than the size A (the diameter of the inflated airbag 40) of the opposing portion to the inner surface of the wheel 22.

According to the above example, usually, the back panel 44 becomes gradually greater towards the occupant-side. Thus, the joint portion 41 is arranged at a position distant from the securing position Q as far as possible and the inflation is made to make the diameter of the inflated airbag 40 of the joint portion 41 as great as possible. For this reason, it is possible to make the diameter of the back panel 44 as small as possible at the inside of the wheel 22 and to set a gravity center G of the airbag 40 at a position close to the occupant P. Thereby, the airbag 40 can easily swing about the securing place to the retainer member 50.

In the meantime, usually, when it is assumed that the back panel 44 becomes gradually greater towards the occupant-side, as the position of the joint portion 41 of the airbag 40 is more distant from the securing position Q to the retainer member 50, an inclination angle α of the back panel 44 relative to an extension direction (an extension plane of the retainer member 50) of the securing position Q shown in FIG. 5 becomes greater. As the inclination angle α becomes greater, a space β between a surface of the wheel 22 facing towards the occupant-side and the airbag 40 upon the attachment to the steering wheel 20 is greater, so that the airbag 40 can further swing with respect to the external force.

In the meantime, the part (the joint portion 41), which is a target of the size L3 (the diameter of the inflated airbag 40 of the joint portion 41), has a linear shape, in FIG. 5. However, the joint portion 41 (the stitch portion) may have an undulating shape, depending on an overlapping shape of a yarn direction of fabric of the front panel 42 and a yarn direction of fabric of the back panel 44. In this case, an average value of respective sizes of a maximum size part and a minimum size part of the undulating shape from the securing position Q is determined as the size to the joint portion 41.

Thereby, when the airbag 40 secured to the retainer member 50 is inflated, the airbag 40 is difficult to contact the inner surface of the wheel 22 with high force. For this reason, the airbag 40 can swing about the securing place to the retainer member 50. When the occupant is contacted to the airbag 40, even though the moving direction of the occupant is oblique with respect to the front-rear direction of the vehicle, the airbag 40 can move so that it is inclined in the moving direction of the occupant. Thereby, it is possible to effectively hold the occupant who is moving obliquely forward, while avoiding an increase in a capacity of the airbag 40.

In the meantime, the size A and the inclination angle α can be implemented by adjusting the maximum diameter of the inflated airbag 40, providing the tether belt 48 in the airbag 40, changing the panel shape of the back panel shown in FIG. 3, and the like.

Regarding a method of adjusting the inclination angle α, the front panel 42 shown in FIG. 3 has a circular shape, for example. Also, the back panel 44 has a shape where recess portions 44a having a notched shape of which a width is gradually narrowed from an outer periphery-side towards a center are formed at parts (here, two parts facing each other with the center being interposed therebetween) of a circular outer periphery. When side portions of each recess portion 44a, which face each other, are joined by the stitching and the like, the back panel 44 has a conical shape. When the peripheral edge portion of the back panel 44 having the conical shape and the peripheral edge portion of the front panel 42 are joined by the stitching and the like, it is possible to obtain the airbag 40 capable of inflating into a shape where the size L3 to the joint portion 41 is located at a position spaced from the securing position Q by 0.5 or greater when the size L2 between the securing position Q of the airbag 40 to the retainer member 50 and the most protruding portion of the airbag 40 with respect to the securing position Q is set as 1, as shown in FIG. 5.

Meanwhile, in order to largely set the inclination angle α (in order to enlarge the most protruding portion obtained by the back panel) in FIG. 5, a central angle γ (here, the central angle γ is defined on the basis of the stitching place) of the recess portion 44a shown in FIG. 3 is preferably made to be large. To the contrary, in order to small set the inclination angle α, the central angle γ of the recess portion 44a is preferably made to be small. Thereby, it is possible to easily adjust the inclination angle α of the back panel 44.

Meanwhile, in FIG. 3, the width of the recess portion 44a defines a narrowing (expanding) degree of the back panel 44. For this reason, it is possible to appropriately adjust the inflation shape of the back panel 44 and to implement an airbag 40B (refer to FIG. 7) of which the diameter of the inflated airbag 40 stepwise changes by appropriately adjusting the shape of both edge portions of the recess portion 44a.

Figure 7:
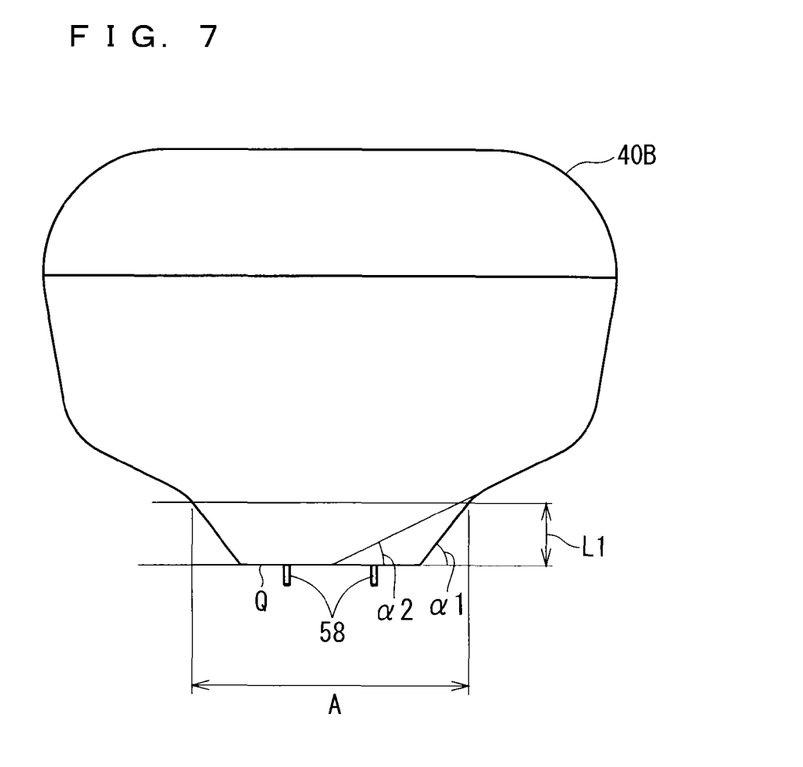
FIG. 7 illustrates an airbag in accordance with a modified embodiment.

Also, according to the airbag 40B of a modified embodiment shown in FIG. 7, in the airbag 40B having undergone spontaneous inflation without being attached to the steering wheel 20, a portion (a portion more spaced from the securing position Q towards the occupant-side than the size L1) of the airbag 40B, which is located at a position closer to the occupant-side than the opposing portion to the inner surface of the wheel 22, includes a portion that is to be inflated more rapidly than a portion (a portion close to the securing position Q from a position spaced from the securing position Q towards the occupant-side by the size L1) closer to the retainer member 50-side than the opposing portion to the inner surface of the wheel 22.

That is, in FIG. 7, a portion of the airbag 40B spaced from the securing position Q towards the occupant-side beyond the size L1 includes a portion of which an inclination angle α2 is smaller than a maximum inclination angle α1 (an inclination angle relative to the extension plane of the retainer member 50) of a portion (here, a portion of the securing position Q) of the airbag 40B closer to the securing position Q than the position spaced from the securing position Q towards the occupant-side by the size L1.

In other words, in the example of FIG. 7, the inclination angle of the airbag 40B gradually decreases towards the protruding direction front-back of the wheel 22 in the direction of the central axis.

For this reason, it is possible to enable the airbag 40B to easily swing about the securing place to the retainer member 50 by making the diameter size A of the opposing portion of the airbag 40B to the inner surface of the wheel 22 as small as possible. At the same time, the airbag 40B can be enabled to inflate as large as possible at a position across the wheel 22 towards the occupant-side, so that it is possible to more securely hold the occupant who is moving obliquely forward.

In the examples of FIG. 5, FIG. 7, FIG. 8 and FIG. 9, a portion of the airbag closer to the retainer member 50 than the wheel 22 may be configured to gradually greater towards the retainer member 50.

Also, the gravity center of the airbag 40 is preferably located at a position close to the occupant so that the airbag 40 can more easily swing about the securing place to the retainer member 50.

That is, as shown in FIG. 5 and the like, in the airbag having undergone spontaneous inflation without being attached to the steering wheel 20, the size between the securing position Q of the airbag 40 to the retainer member 50 and the most protruding portion of the airbag 40 with respect to the securing position Q is denoted as L2. A size between a position of the gravity center G of the airbag 40 and the securing position Q is denoted as L4. When $L_4 \geq 0.5 \times L2$, i.e., L2=1, the gravity center G is preferably located at a position spaced by 0.5 or greater.

Thereby, the gravity center G of the airbag 40 is set to a position close to the occupant, and the airbag 40 can easily swing about the securing position Q to the retainer member 50, so that it is possible to more securely hold the occupant who is moving obliquely forward.

In order to set the gravity center G of the airbag 40 to a position close to the occupant, it is possible to set the gravity center G to a position close to the occupant by contriving the inflation shape of the airbag 40. The airbag 40 shown in FIG. 5 is set so that it widely inflates at the occupant-side and narrowly inflates at the steering wheel 20-side. Thereby, it is possible to set the gravity center G to a position close to the occupant. Also, it is possible to set the gravity center G to a position close to the occupant by adopting a variety of other configurations (refer to modified embodiments of FIG. 8 and FIG. 9, which will be described later).

Figure 8:
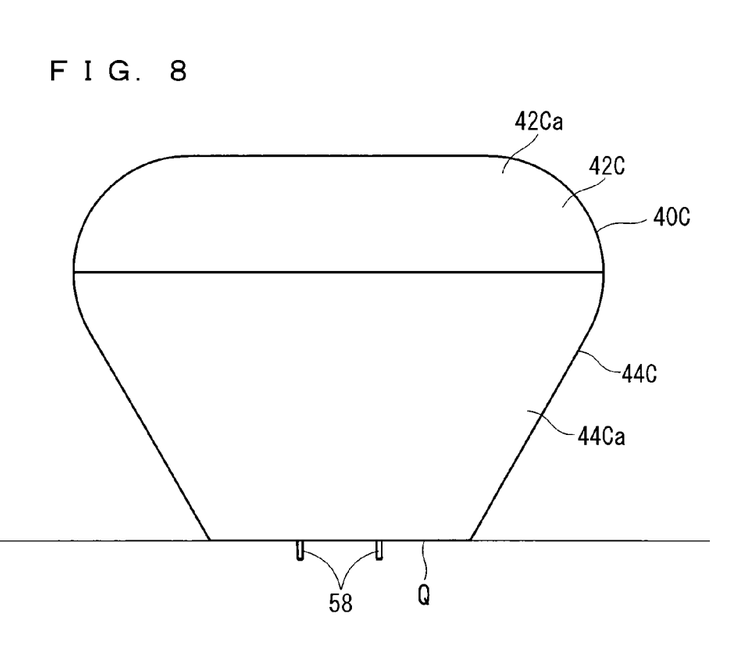
FIG. 8 illustrates an airbag in accordance with another modified embodiment.

For example, like an airbag 40C of a modified embodiment shown in FIG. 8, mass of a front panel 42C corresponding to the front panel 42 is made to be greater than mass of a back panel 44C corresponding to the back panel 44, so that it is possible to set the gravity center G to a position close to the occupant.

To this end, mass of at least one fabric 42Ca per unit area, which is to be included in the front panel 42C, is preferably made to be greater than mass of at least one fabric 44Ca per unit area, which is to be included in the back panel 44C.

Specifically, a density of the fabric 42Ca of the front panel 42C is preferably made to be greater than a density of the fabric 44Ca of the back panel 44C. The densities of the fabrics 42Ca, 44Ca can be adjusted by changing the number of yarns per unit area, a thickness of yarn, and the like.

Also, the masses per unit area of the fabric 42Ca of the front panel 42C and the fabric 44Ca of the back panel 44C can be adjusted by changing whether or not to coat (silicone coating, for example) the fabric 42Ca of the front panel 42C and the fabric 44Ca of the back panel 44C, thicknesses thereof, and the like, too.

Figure 9:
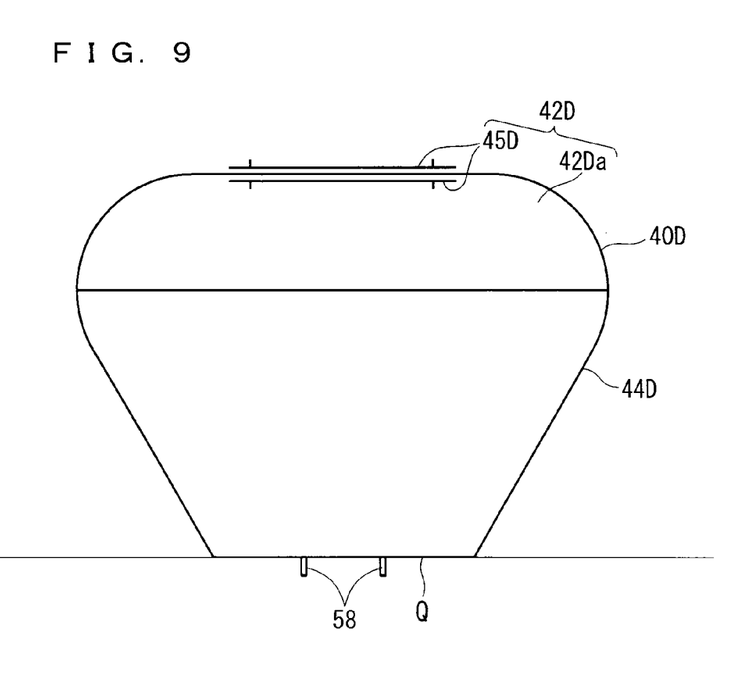
FIG. 9 illustrates an airbag in accordance with still another modified embodiment.

Also, like an airbag 40D of a modified embodiment shown in FIG. 9, it is possible to set the gravity center G to a position close to the occupant by attaching a mass body 45D to a front panel 42D corresponding to the front panel 42.

That is, the airbag 40D has the front panel 42D and the same back panel 44D as the above illustrative embodiment.

The front panel 42D has a circular fabric 42Da and a mass body 45D attached to the fabric 42Da. The mass body 45D is a woven fabric, a fabric of which a woven fabric is applied with a coating agent such as silicone, and the like, like the fabric 42Da, and is attached to the mass body 45D by the stitching, for example. Here, the mass body 45D has a sheet shape smaller than the fabric 42Da. The two mass bodies 45D are attached to front and back sides of a central portion of the fabric 42Da. The mass body 45D may have a sheet shape of which a spreading degree is substantially the same as the fabric 42Da. By this configuration, it is possible to set the gravity center G of the airbag 40D to a position close to the occupant by increasing the mass of the front panel 42D with the mass body 45D.

In the meantime, the back panel 44 shown in FIG. 3 may be configured by a plurality of panels. For instance, in an example of FIG. 10, a back panel 44' is configured by a combination of two divided panels 44aa, 44ab, which are to be overlapped each other at the peripheral edge of the attaching hole 44h, and is formed with the same recess portions 44a' as the recess portions 44.

Figure 10:
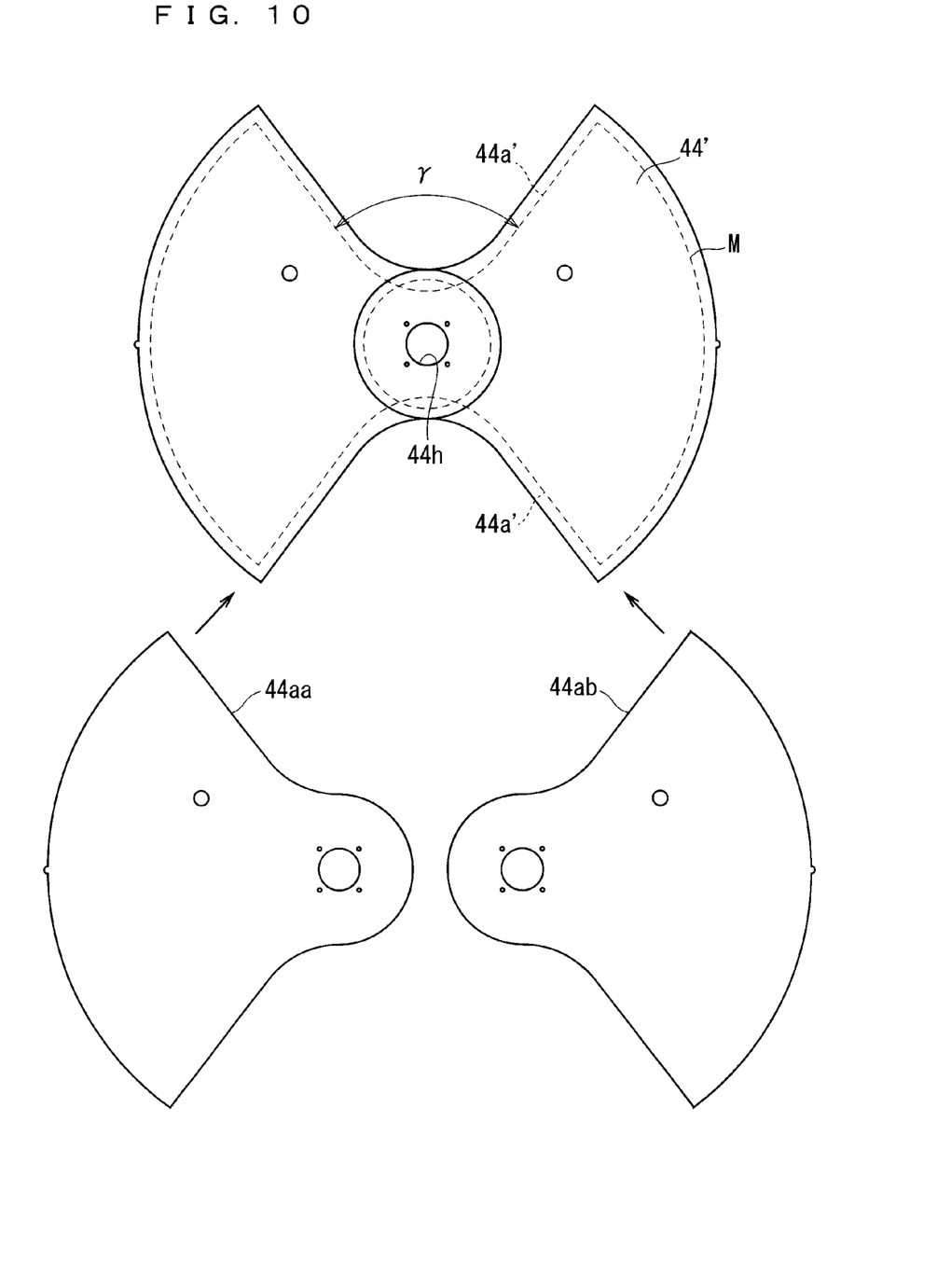
FIG. 10 depicts a modified embodiment of the panel configuring the airbag.
Figure 11:
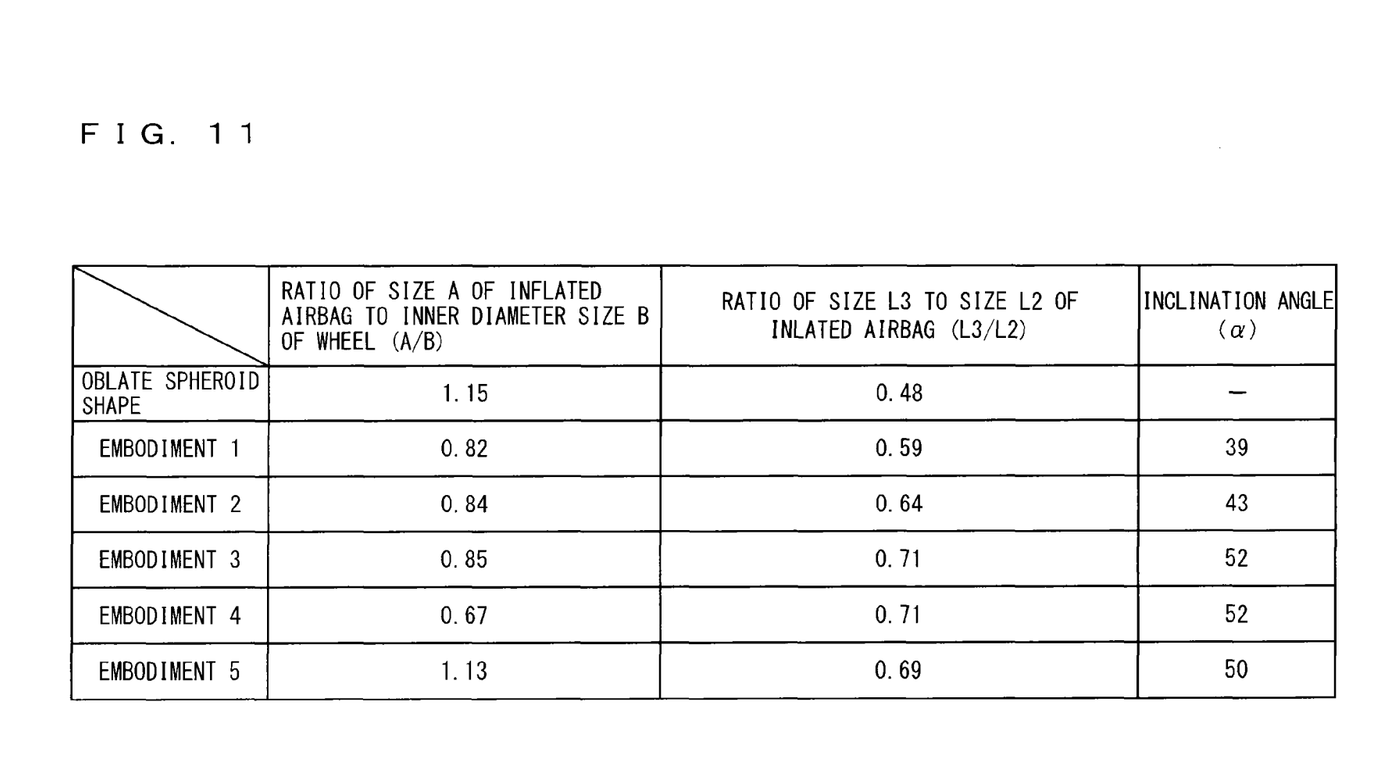
FIG. 11 depicts size examples of various airbags.

For the airbag 40 of the above illustrative embodiment and the airbag of the modified embodiment shown in FIG. 10, the sizes of the respective portions of the airbag 40, the position of the gravity center G and the like were analyzed by CAE (computer aided engineering). The results are shown in FIG. 11. In the meantime, as the CAE analysis software, MADYMO (TASS International Co., Ltd.) was used. Also, as the steering wheel 20, a steering wheel of which the inner diameter size B of the wheel 22 is 314.8 mm and the size L1 between the securing position Q and the wheel 22 is 43.2 mm was assumed.

At the spontaneous inflation states of a variety of embodiments, a ratio (A/B) of the size A, which is the diameter of the inflated airbag 40 of the opposing portion to the inner surface of the wheel 22, and the inner diameter size B of the wheel 22, and a ratio (L3/L2) of the size L2 between the securing position Q of the airbag 40 to the retainer member 50 and the most protruding portion of the airbag 40 with respect to the securing position Q and the size L3 to the joint portion 41 of the front panel 42 and the back panel 44 are shown in FIG. 11.

In the meantime, regarding the shape of the airbag 40, the analysis was performed for a total of six types including the oblate spheroid shape of the related art and the five embodiments in which the back panel 44 of the illustrative embodiment shown in FIG. 5 has a conical shape. In the embodiments 1 to 3, the inclination angle α is sequentially changed so that it stepwise increases, the tether belt having a predetermined length is set and the diameter of the inflated airbag 40 of the joint portion 41 is respectively adjusted so that all the capacities are substantially the same. In the embodiment 4, the tether belt 48 is not set on the basis of the embodiment 3, and in the embodiment 5, the length of the tether belt 48 is shortened on the basis of the embodiment 3.

Comparing the oblate spheroid shape and the embodiments 1 to 3, as shown in FIG. 11, when the back panel 44 is made to have a conical shape, the ratio of the size A (the diameter of the inflated airbag 40) to the inner diameter size B of the wheel 22 is decreased. Also, as the ratio of the size L3 to the size L2 increases, the inclination angle α increases. As a result, the space β between the wheel surface facing the occupant and the bag is increased, so that the airbag 40 can be moved more easily in conformity to the movement of the occupant P.

Also, as shown in the embodiments 4 and 5 of FIG. 11, it can be seen that the ratio of the size A (the diameter of the inflated airbag 40) to the size B (the inner diameter of the wheel 22) is changed depending on whether or not the tether belt 48 and the length thereof.

If the length of the tether belt 48 is too shortened, the ratio of the size A (the diameter of the inflated airbag 40) to the size B (the inner diameter of the wheel 22) increases and the central position tends to come close to the retainer member 50-side from the occupant-side. Therefore, even when the airbag 40 is configured by the combination of the panels shown in FIG. 3 or 10, it is necessary to appropriately consider the diameter of the inflated airbag 40, the length of the tether belt 48, and the like.

Also, for the respective embodiments of FIG. 11, the CAE analysis was performed to examine whether it is possible to effectively hold the occupant P who is moving obliquely forward. The evaluation was performed by the angular velocity at which a head of the occupant P swings about an axis connecting a neck and a crown of the head after the head is received on the airbag having the oblate spheroid shape of the related art and the airbag 40 of the disclosure.

Figure 12:
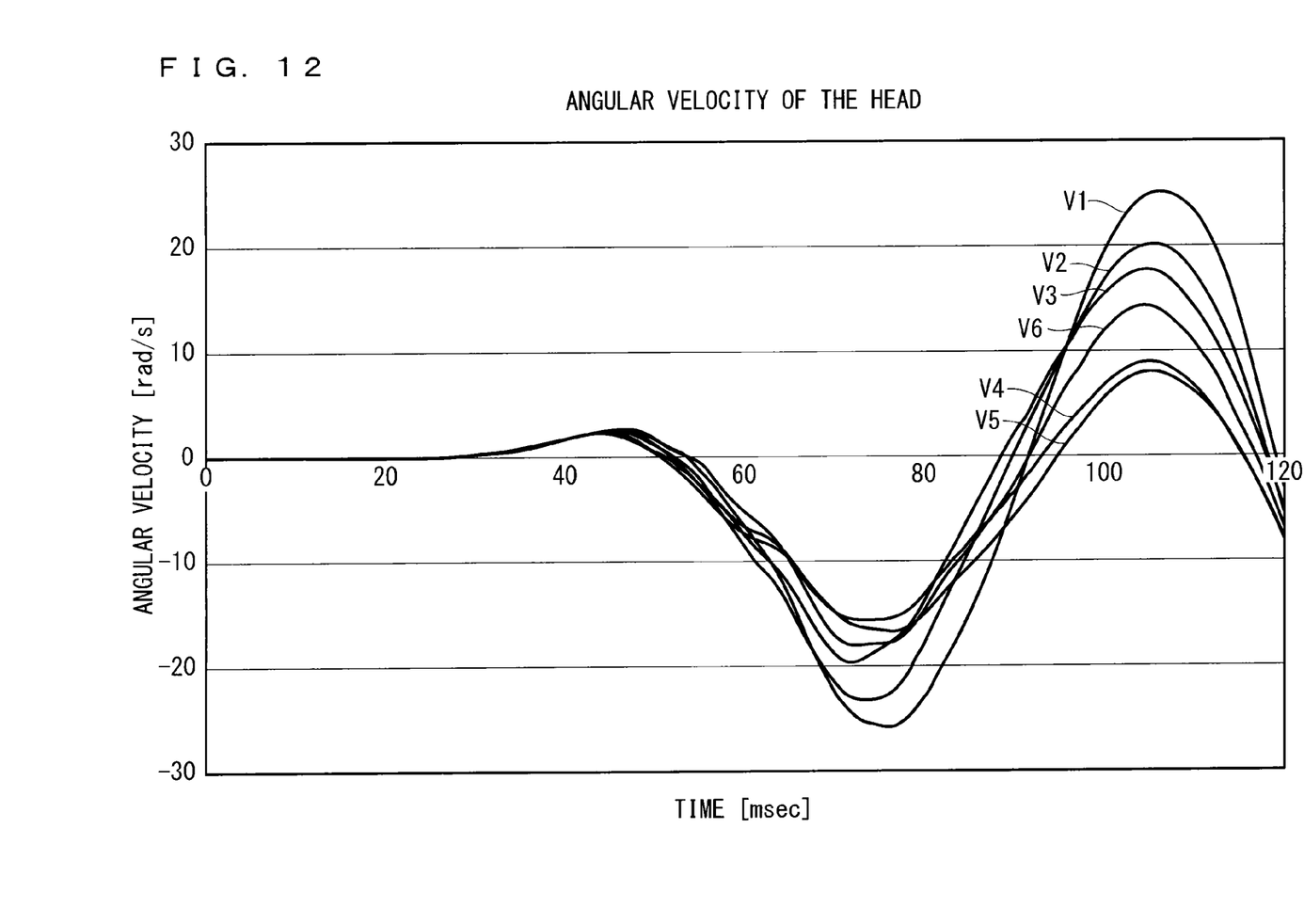
FIG. 12 depicts changes in an angular velocity of a head when the head is contacted to a variety of airbags.

The analysis result is shown in FIG. 12. In FIG. 12, a curve V1 indicates the airbag having the oblate spheroid shape, a curve V2 indicates the embodiment 1, a curve V3 indicates the embodiment 2, a curve V4 indicates the embodiment 3, a curve V5 indicates the embodiment 4 and a curve V6 indicates the embodiment 5.

As shown with the curves V1 to V4 of FIG. 12, it can be seen that the angular velocity of the head is small and the head is effectively held in the embodiments. In particular, as the ratio (L3/L2) and the ratio (A/B) are greater (that is, as the inclination angle α increases), it can be seen that the angular velocity of the head decreases and the head can be effectively held.

Also, as shown with the curve V5, even when the tether belt 48 is not provided, it is possible to decrease the angular velocity, and as shown with the curve V6, even when the ratio of the size A (the diameter of the inflated airbag 40) of the airbag 40 to the inner diameter B of the wheel 22 increases, the good influence on the angular velocity can be made.

From the above analysis result, it can be said that when the ratio of the size A (the diameter of the inflated airbag 40) of the airbag 40 to the inner diameter B of the wheel 22 is set to 0.6 to 1.2 times, it is effective to set the size L3 to the joint portion 41 of the front panel 42 and the back panel 44 to a position spaced from the securing position Q by 0.5 or greater.

In the meantime, the respective configurations described in the illustrative embodiment and the modified embodiments can be appropriately combined inasmuch as the configurations are mutually consistent.

For example, the modified embodiment of FIG. 7 and the modified embodiment of FIG. 8 may be combined, and the modified embodiment shown in FIG. 7 or FIG. 8 and the modified embodiment of FIG. 9 or FIG. 10 may be combined.

Although the disclosure has been described in detail, the above descriptions are just exemplary in all aspects and the disclosure is not limited thereto. A variety of modified embodiments not exemplified can be made without departing from the scope of the disclosure.

The invention claimed is:

1. An airbag device that is attachable to a steering wheel comprising a wheel hub and an annular wheel provided around the wheel hub, the airbag device comprising:
    an inflator that generates gas;
    an airbag that is inflatable by the gas and comprises a front panel, which comprises at least one fabric and is capable of restraining an occupant upon inflation under emergency of a vehicle, and a back panel, which comprises at least one fabric and is provided at a side closer to the wheel hub than the front panel; and
    a retainer member that is secured to the wheel hub at a state where the inflator and the airbag are secured,
    wherein in the airbag having undergone spontaneous inflation without being attached to the steering wheel,
    when a size between a securing position of the airbag to the retainer member and the most protruding portion of the airbag with respect to the securing position is set as 1, the most protruding portion by the back panel is located at a position spaced from the securing position by 0.5 or greater,
    a diameter of the inflated airbag of an opposing portion to an inner surface of the wheel is 0.6 to 1.2 times as large as an inner diameter of the wheel, and
    a diameter of the inflated airbag of a joint portion of the front panel and the back panel is greater than the diameter of the inflated airbag of the opposing portion to the inner surface of the wheel, and
    an inclination angle of the back panel is set to be substantially uniform in an entire surrounding thereof.

2. The airbag device according to claim 1, wherein in the airbag having undergone spontaneous inflation without being attached to the steering wheel,
    when the size between the securing position of the airbag to the retainer member and the most protruding portion of the airbag with respect to the securing position is set as 1, a gravity center position of the airbag is located at a position spaced from the securing position by 0.5 or greater.

3. An airbag device that is attachable to a steering wheel comprising a wheel hub and an annular wheel provided around the wheel hub, the airbag device comprising:
    an inflator that generates gas;

an airbag that is inflatable by the gas and comprises a front panel, which comprises at least one fabric and is capable of restraining an occupant upon inflation under emergency of a vehicle, and a back panel, which comprises at least one fabric and is provided at a side closer to the wheel hub than the front panel; and a retainer member that is secured to the wheel hub at a state where the inflator and the airbag are secured, wherein in the airbag having undergone spontaneous inflation without being attached to the steering wheel, when a size between a securing position of the airbag to the retainer member and the most protruding portion of the airbag with respect to the securing position is set as 1, the most protruding portion by the back panel is located at a position spaced from the securing position by 0.5 or greater, a diameter of the inflated airbag of an opposing portion to an inner surface of the wheel is 0.6 to 1.2 times as large as an inner diameter of the wheel, a diameter of the inflated airbag of a joint portion of the front panel and the back panel is greater than the diameter of the inflated airbag of the opposing portion to the inner surface of the wheel, wherein in the airbag having undergone spontaneous inflation without being attached to the steering wheel, when the size between the securing position of the airbag to the retainer member and the most protruding portion of the airbag with respect to the securing position is set as 1, a gravity center position of the airbag is located at a position spaced from the securing position by 0.5 or greater, and wherein mass of the at least one fabric per unit area, which is to be included in the front panel, is greater than mass of the at least one fabric per unit area, which is to be included in the back panel.

4. An airbag device that is attachable to a steering wheel comprising a wheel hub and an annular wheel provided around the wheel hub, the airbag device comprising:

an inflator that generates gas;

an airbag that is inflatable by the gas and comprises a front panel, which comprises at least one fabric and is capable of restraining an occupant upon inflation under emergency of a vehicle, and a back panel, which comprises at least one fabric and is provided at a side closer to the wheel hub than the front panel; and a retainer member that is secured to the wheel hub at a state where the inflator and the airbag are secured, wherein in the airbag having undergone spontaneous inflation without being attached to the steering wheel, when a size between a securing position of the airbag to the retainer member and the most protruding portion of the airbag with respect to the securing position is set as 1, the most protruding portion by the back panel is located at a position spaced from the securing position by 0.5 or greater, a diameter of the inflated airbag of an opposing portion to an inner surface of the wheel is 0.6 to 1.2 times as large as an inner diameter of the wheel, a diameter of the inflated airbag of a joint portion of the front panel and the back panel is greater than the diameter of the inflated airbag of the opposing portion to the inner surface of the wheel, wherein in the airbag having undergone spontaneous inflation without being attached to the steering wheel, when the size between the securing position of the airbag to the retainer member and the most protruding portion of the airbag with respect to the securing position is set as 1, a gravity center position of the airbag is located at a position spaced from the securing position by 0.5 or greater, and wherein the front panel comprises a mass body attached to at least a part of the front panel.

* * * * *